United States Patent
Currie et al.

(10) Patent No.: US 8,557,897 B2
(45) Date of Patent: Oct. 15, 2013

(54) COATING COMPOSITION, COATING AND AN OBJECT COATED WITH THE COATING COMPOSITION

(75) Inventors: Edwin Currie, Sittard (NL); Jens Thies, Maastricht (NL); Paul Holmes, Maastricht (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 13/429,723

(22) Filed: Mar. 26, 2012

(65) Prior Publication Data
US 2012/0174820 A1 Jul. 12, 2012

Related U.S. Application Data

(62) Division of application No. 11/659,511, filed as application No. PCT/NL2005/000486 on Jul. 7, 2005, now abandoned.

(30) Foreign Application Priority Data

Aug. 10, 2004 (EP) .................................. 04077284

(51) Int. Cl.
*C08K 9/04* (2006.01)

(52) U.S. Cl.
USPC ........... 523/218; 524/403; 524/409; 524/423; 524/430; 524/432; 524/437; 524/492; 524/493

(58) Field of Classification Search
USPC .......... 523/216; 524/403, 409, 413, 430, 432, 524/437, 492, 493
See application file for complete search history.

(56) References Cited

U.S. PATENT DOCUMENTS

| | | | |
|---|---|---|---|
| 5,733,644 A | 3/1998 | Tanaka et al. | |
| 6,008,285 A | 12/1999 | Kasemann et al. | |
| 6,323,257 B1 | 11/2001 | Moffatt et al. | |
| 2002/0004140 A1 | 1/2002 | Swan et al. | |
| 2002/0120333 A1 | 8/2002 | Keogh et al. | |
| 2002/0134266 A1 | 9/2002 | Yamasaki et al. | |
| 2004/0091440 A1 | 5/2004 | Kamei et al. | |
| 2004/0237833 A1 | 12/2004 | Grager et al. | |
| 2006/0062854 A1 | 3/2006 | Chandra et al. | |
| 2006/0191671 A1 | 8/2006 | Boger et al. | |

FOREIGN PATENT DOCUMENTS

| | | |
|---|---|---|
| DE | 101 16 200 A1 | 10/2002 |
| DE | 102 39 762 A1 | 3/2004 |
| EP | 1 277 766 A2 | 1/2003 |
| EP | 1479734 | 11/2004 |
| JP | 6-4787 | 1/1994 |
| JP | 09-104833 | 4/1997 |
| JP | 2001-064439 | 3/2001 |
| JP | 2003-055611 | 2/2003 |
| WO | 03/048258 | 6/2003 |
| WO | 2004/104114 | 12/2004 |

OTHER PUBLICATIONS

International Search Report mailed Sep. 29, 2005 in PCT/NL2005/000486.
Written Opinion mailed Sep. 29, 2005 in PCT/NL2005/000486.
Machine translation, Roth, Christopher, DE 10239762, Mar. 2004.
P2007-525559, Notice of Reasons for Rejection (Apr. 17, 2012).

*Primary Examiner* — Peter Szekely
(74) *Attorney, Agent, or Firm* — Nixon & Vanderhye P.C.

(57) ABSTRACT

A process for producing a coating composition includes separately chemically grafting particles with compounds having reactive groups and compounds having hydrophilic polymer chains. The hydrophilic polymer chains dissolve in water at least one temperature between 0 and 100° C. The reactive groups may react with the substrate and or react with one another to form a cross-linked coating, comprising the particles. A process for forming a coating on a substrate is also provided.

17 Claims, No Drawings

COATING COMPOSITION, COATING AND AN OBJECT COATED WITH THE COATING COMPOSITION

This application is a divisional of commonly owned U.S. application Ser. No. 11/659,511, filed Jul. 26, 2008 (now abandoned), which is the national phase application under 35 USC §371 of PCT/NL2005/000486 filed Jul. 7, 2005 which designated the U.S. and claims benefit of EP 04077284.0, filed Aug. 10, 2004, the entire contents of each of which are hereby incorporated by reference.

The invention relates to a coating composition and a coating comprising a hydrophilic polymer, a device coated with the coating composition and particles for use in the coating composition.

Coating compositions comprising hydrophilic polymers are applied on different objects, to give all kind of properties to those objects. It is possible that the coating composition is applied to objects with the purpose to suppress or prevent biofouling. Objects made of synthetic materials in contact with water are generally prone to suffer from undesired accumulation of biologically derived organic species, also referred to as biofouling, be it by example protein adsorption, bacterial adsorption and subsequent spreading, or thrombosis. This undesired accumulation has serious consequences; for example, in the medical area bacterial infections via catheters may be caused by the accumulation and in industry the clogging of filters, accumulation of organic material on surfaces etc also causes problems.

Grafting hydrophilic polymer chains to the surface of the articles made of the synthetic materials has been seen as a manner to decrease or even to prevent biofouling.

It is also possible that that such a coating containing hydrophilic polymers also comprises specific additives, like for example therapeutic species. Also specific functional groups may be adehered to the hydrophilic polymers or otherwise incorporated into the coating, to make the coating for example bioreactive, for example to bind anti-bodies, cell receptors, enzymes etc.

A coating composition and a coating comprising hydrophilic polymer chains is known from S. J. Sophia, et al, Macromolecules 31, 5059 (1998). The coating is obtained by grafting to a surface hydrophilic polymer chains to obtain a coating comprising hydrophilic polymer chains, by using hydrophilic polymer chains with one reactive group that react with the reactive groups in the surface. However the thickness of the layer of grafted hydrophilic polymers is limited to only a few molecules. Therefore the layer has insufficient mechanical robustness and is easily damaged, so that antibiofouling properties are lost. A further disadvantage is that that the processing is laborious, i.e. the chemical grafting of groups often necessitates an extra treatment of the surface to make the reaction feasible. Yet a further problem is that the anti-biofouling properties are insufficient.

Another method is using Langmuir Blodgett technique to transfer hydrophilic chains to a surface, optionally grafting them afterwards, as described in E. P. K. Currie et al, Applied Chem. 71, 1227 (1999). However this process is time consuming and it is only suitable for batch-wise processes and specific substrates. A further problem is that the anti-biofouling properties are not optimal and again the mechanical robustness of such a coating is insufficient.

Yet another method is to use a cross-linked coating comprising reactive polymers. These can be either linear polymers crosslinked in situ by electron beam, as described in P. Krsko et al, Langmuir 19, 5618 (2003) or starlike polymers which crosslink via e.g. isocyante groups. This results in hydrogel coatings which have protein repellant properties, are lubricous but lack mechanical robustness.

In DE-10239762 a composition nanoparticles having polypropyleneglycol sulfogroups on their surface is disclosed. In this case no hydrophilic polymer chains are used, since the water solubility is obtained by the ionic —SO3Na group and not by the polypropyleneglycol chains, so that the composition is not suitable for anti-fouling applications. Furthermore the particles are very complicated to produce and there are no or only limited possibilities to change the composition of the particles to optimise the composition with respect to its intended use.

Aim of the present invention is to provide a coating composition comprising a hydrophilic polymer, which may be applied to various objects having all kind of functions.

Surprisingly this object is obtained by a coating composition comprising particles being chemically grafted with reactive groups and hydrophilic polymers.

A further advantage of the resulting coating shows good mechanical properties, like hardness and scratch resistance.

Yet a further advantage is that the coating shows good anti-biofouling properties.

Yet another advantage is that the coating shows good anti-fogging properties.

Yet a further advantage is that the coating shows a good adhesion to substrates.

Yet a further advantage is that the coating may have good lubricious properties.

Yet a further advantage is that the coating can be designed to be bioreactive, by grafting specific groups to the surface of the particles, or incorporating them in the network formed by said reactive particles.

Yet another advantage of the coating composition is its optical clarity, especially in the dry state.

Particles

The coating composition may comprise all kind of particles, as long as the particles are grafted with the reactive groups and the hydrophilic polymer chains. It is possible that the coating composition comprises organic and/or inorganic particles. Examples of organic particles are carbon nano tubes or carbon nano spheres. Preferably the coating composition comprises inorganic particles, because in this way a very strong coating is obtained. Preferably the average largest diameter of the particles is less than 10 micron, preferably less than 1 micron. Still more preferably the average largest diameter of the particles is less than 100 nm, still more preferably less than 50 nm. This is because this provides a very strong coating, having a smooth surface. It is also possible with particles of these very small diameters to provide a transparent coating.

In the case of spherical particles there is only one diameter to consider, so that the diameter is equal to the smallest diameter. For non-spherical particles (for instance but not limited to rods and platelets) the largest diameter is measured as the largest straight line drawn across the particle. Methods for determining the particle dimensions include optical microscopy, scanning microscopy and atomic force microscopy (AFM). If a microscopical method is used the dimensions of 100 randomly chosen particles are measured and the average is calculated. Examples of suitable inorganic particles are particles that comprise $SiO_2$, $TiO_2$, $ZnO_2$, $TiO_2$, $SnO_2$, Am—$SnO_2$, $ZrO_2$, Sb—$SnO_2$, $Al_2O_3$, Au or Ag.

Hydrophilic Polymers

It is possible that the particles are grafted with all kind of hydrophilic polymer chains. A hydrophilic polymer chain is a polymer chain that dissolves in water at at least one temperature between 9 and 100° C. Preferably a polymer is used that dissolves in water in a temperature range between 20 and 40° C. Preferably the hydrophilic polymer dissolves for at least 0.1 gram per liter of water, more preferably for at least 0.5 grams per liter, most preferably for at least 1.0 gram per liter. For determining the solubility in water the polymer chains are taken not comprising the groups for grafting the polymer chains or any other group that is attached to the polymer after the polymerisation, for example an ionic group. Preferably the solubility is determined in water having a pH of between 3 and 10, more preferably in between 5.5 and 9, most preferably having a pH of 7.

The polymer chain may comprise one monomer species (homopolymer), or more species (copolymer) arranged in a random manner or in ordered blocks.

Preferably the hydrophilic polymer chains comprise monomer units of ethylene oxide, (meth)acrylic acid, (meth)acrylamide, vinylpyrrolidone, 2-hydroxyethyl(meth)acrylate, phosphorylcholine, glycidyl(meth)acrylate or saccharides.

One of the typical advantages that the coating imparts to the coated object are very good anti-biofouling properties of the coating, resulting from the hydrophilicity of the polymer chain. These properties increase with increasing concentration and length of hydrophilic polymer chain at the surface of the coating.

Preferably the chains of the hydrophilic polymer comprise at least an average of 5 monomeric units, more preferably the polymer comprises at least an average of 7 monomeric units, still more preferably the polymer comprises at least an average of 10 monomeric units, most preferably the polymer comprises at least an average of 15 monomeric units.

The concentration may for example be increased by increasing the density of grafted polymers to the particles, increasing the length, or by increasing the weight ratio of the particles in the coating composition.

For obtaining good anti-fogging properties polymer chains having a relatively short length are preferred.

Another advantage of the coating composition is a low static water contact angle. Preferably the static water contact angle is below 50°, more preferably below 40°, still more preferably below 30°.

Groups Used for Grafting

Groups for grafting the hydrophilic polymer chains and compounds comprising the reactive groups to the particles may comprise all groups known in the art for grafting, for instance but not limited to (trialkoxy)silanes, thiols, amines, silane hydrides. Due to the grafting reaction the hydrophilic polymer chains and the compounds comprising the reactive groups are chemically bounded to the surface of the particles. It is possible that the hydrophilic polymers and the compounds comprising the reactive group comprise more than one group for grafting per molecule. In a more preferred embodiment the hydrophilic polymers and the compounds reactive groups have on average one group for grafting per molecule. In case of the hydrophilic polymer the group for grafting preferably is an endgroup attached to the chain of the hydrophilic polymer.

Reactive Groups.

As reactive groups groups are used that may react with the substrate and/or react to form a cross-linked phase so to form a coating comprising the particles. It is possible that a single species of reactive groups is used, able to mutually react, for example in a homo polymerisation reaction. Examples of such reactive groups include acrylate and methacrylate groups. Another possibility is that a mixture of groups is used, for example groups that are able to react in a copolymerisation reaction. Examples of such groups include carboxylic acids and/or carboxylic anhydrides combined with epoxies, acids combined with hydroxy compounds, especially 2-hydroxyalkylamides, amines combined with isocyanates, for example blocked isocyanate, uretdion or carbodiimide, epoxies combined with amines or with dicyandiamides, hydrazinamides combined with isocyanates, hydroxy compounds combined with isocyanates, for example blocked isocyanate, uretdion or carbodiimide, hydroxy compounds combined with anhydrides, hydroxy compounds combined with (etherified) methylolamide ("amino-resins"), thiols combined with isocyanates, thiols combined with acrylates or other vinylic species (optionally radical initiated), acetoacetate combined with acrylates, and when cationic crosslinking is used epoxy compounds with epoxy or hydroxy compounds. Addition reactions such as 2+2 photo cyclo addition and 4+2 thermal additions are also possible.

It is also possible that reactive groups are attached to the hydrophilic polymer chains, however preferably at least 20 wt. % of the hydrophilic polymer chains do not comprise such a reactive group. More preferably at least 50 wt. %, still more preferably at least 80 wt. % of the hydrophilic polymer chains do not comprise such a reactive group. Most preferably the hydrophilic polymer chains do not comprise any of such reactive groups at all.

Reactive Diluents

The coating composition may comprise one or more reactive diluents, defined as a compound that has at least one group capable of reacting mutually and or capable of reacting with the reactive groups grafted to the particles.

In principle a wide variety of compounds are suitable to be used as the reactive diluent, for example monomers or oligomers having the same groups as the reactive groups as defined above. In a preferred embodiment, these reactive diluents are water soluble in the same temperature range as the grafted hydrophilic polymer.

Possible compounds that may be used as the reactive diluent are isocyanates, alkoxy titanates, alkoxy zirconates, or urea-, urea/melamine-, melamine-formaldehyde or phenol-formaldehyde (resol, novolac types), or radical curable (peroxide- or photo-initiated) unsaturated mono- and polyfunctional monomers and polymers, e.g. acrylates, methacrylates, maleate/vinyl ether), or radical curable (peroxide- or photo-initiated) unsaturated e.g. maleic or fumaric, polyesters in styrene and/or in methacrylates.

Method for Crosslinking.

Any cross-linking method that may cause the reactive groups to react and so to form the cross-linked phase so that a coating is formed is suitable to be used in the process according to the invention. Suitable ways to initiate crosslinking are for example electron beam radiation, electromagnetic radiation (UV, Visible and Near IR), thermally and by adding moisture, in case moisture curable compounds are used. In a preferred embodiment crosslinking is achieved by UV-radiation. The UV-crosslinking may take place through a free radical mechanism or by a cationic mechanism, or a combination thereof. In another preferred embodiment the crosslinking is achieved thermally. Also combinations of different cure methods are possible.

Initiator

An initiator may be present in the mixture to initiate the crosslinking reaction. The amount of initiator may vary between wide ranges. A suitable amount of initiator is for example between above 0 and 5 wt % with respect to total weight of the compounds that take part in the crosslinking reaction.

When UV-crosslinking is used, the mixture preferably comprises one or more UV-photo-initiators. Any known UV-photo-initiators may be used in the process according to the invention.

Coating Thickness

The coating according to the invention can be prepared in any desired thickness. The coatings according to the invention typically have a thickness ranging between 50 nm to tens of micrometers.

Substrates

A wide variety of substrates may be used as a substrate in the process according to the invention. Suitable substrates are for example flat or curved, rigid or flexible substrates including films of for example polycarbonate, polyester, polyvinyl acetate, polyvinyl pyrollidone, polyvinyl chloride, polyimide, polyethylene naphthalate, polytetrafluoro ethylene, nylon, polynorbornene or amorphous solids, for example glass or crystalline materials, such as for example silicon or gallium arsenide. Metallic substrates such as steel may also be used.

A free-standing coating obtainable by a process according to the invention may be obtained by preparing a film or coating on a substrate and subsequently removing the film or coating from the substrate after crosslinking.

Application of the Mixture to a Substrate

The mixture may be applied onto the substrate by any process known in the art of wet coating deposition in one or multiple steps. Examples of suitable processes are spin coating, dip coating, spray coating, flow coating, meniscus coating, capillary coating and roll coating. An object may be totally coated or partially coated with the coating composition. Also partial crosslinking of the coating and removal of the non-crosslinked part is possible, by for instance but not limited to photolithography.

In a first embodiment the mixture according to the invention is applied as the only coating on the substrate. In a second embodiment the coating in applied on top of one or more coatings. Those versed in the art will know which coatings to select to optimise properties such as adhesion, hardness, optical clarity etc.

After application and curing of the coating, further processing steps such as but not limited to a heat treatment or radiation treatment is possible.

Solvent

The composition according to the invention may comprise a solvent, for example to prepare a composition according to the invention that is suitable for application to the substrate using the chosen method of application.

In principle, a wide variety of solvents may be used. The solvent preferably has the ability to form stable suspensions of the particles grafted with the reactive groups and the hydrophilic polymer chains, in order to obtain good quality coatings i.e. after evaporation of the solvent. The particles typically are added to the mixture in the form of a suspension. The same solvent as used in the suspension may be used to adjust the mixture so that it has the desired properties. However, other solvents may also be used.

Preferably the solvent used evaporates after applying the mixture onto the substrate. In the process according to the invention, optionally the mixture may after application to the substrate be heated or treated in vacuum to aid evaporation of the solvent.

Examples of solvent that may be suitable are 1,4-dioxane, acetone, acetonitrile, chloroform, chlorophenol, cyclohexane, cyclohexanone, cyclopentanone, dichloromethane, diethyl acetate, diethyl ketone, dimethyl carbonate, dimethylformamide, dimethylsulphoxide, ethanol, ethyl acetate, m-cresol, mono- and di-alkyl substituted glycols, N,N-dimethylacetamide, p-chlorophenol, 1,2-propanediol, 1-pentanol, 1-propanol, 2-hexanone, 2-methoxyethanol, 2-methyl-2-propanol, 2-octanone, 2-propanol, 3-pentanone, 4-methyl-2-pentanone, hexafluoroisopropanol, methanol, methyl acetate, methyl acetoacetate, methyl ethyl ketone, methyl propyl ketone, n-methylpyrrolidone-2, n-pentyl acetate, phenol, tetrafluoro-n-propanol, tetrafluoroisopropanol, tetrahydrofuran, toluene, xylene and water. Alcohols, ketones and esters based solvents may also be used, although the solubility of acrylates may become an issue with high molecular weight alcohols. Halogenated solvents (such as dichloromethane and chloroform) and hydrocarbons (such as hexanes and cyclohexanes), may also be suitable. Preferably methanol, methyl ethyl keton or isopropanol are used.

In a more preferred embodiment mixtures of organic solvents with water are used. In the most preferred embodiment water is used as solvent.

Adhesion Promoters

Preferably the composition according to the invention comprises a compound that increases the adhesion of the coating to the substrate. These may be for example silane acrylate compounds for usage of acrylate-containing coatings on glass. The skilled artisan will be able to select a suitable adhesion promoter for the desired substrate.

Additional Additives

In a further embodiment the composition according to the invention may contain one or more species that diffuse out of the coating during usage. Such species may be used for lubricity, adhesional purposes or comprise therapeutic species. Examples of such species are for instance but not limited to heparin, vitamines, anti-inflamatory agents, antimicrobial functionalities such as quaternium ammonium ions, peptide sequences, halogen labile species etc., biomolecule receptor sites.

Post-processing steps, after the composition has been applied to the substrate may include: addition of migreatable species, for instance drugs, via reversible sorption, or chemical grafting of bioactive species to remnant reactive groups in the coating.

The invention also relates to a film or coating obtainable from the coating composition according to the present invention. The invention also relates to objects partly or in whole coated with the coating composition according to the present invention.

The invention also relates to particles grafted with reactive groups and hydrophilic polymers as used in the composition according to the invention.

Applications

Applications of the coating include coatings with anti-biofouling or anti-thrombogenic properties, coatings with anti-inflammatory properties, anti-microbial coatings, coatings to prevent biofilm formation, coatings for bioreceptors, coatings with anti-fogging properties. It is also possible that the coating is applied to an object to enhance wetting by aqueous solutions of the object.

The invention also relates to a process for producing the coating composition according to the present invention comprising the step of chemically grafting a hydrophilic chain to a particle.

With this process various coating compositions may be obtained, suitable for all kind of applications.

EXAMPLES

The invention will be further explained by the examples, without being limited by that.

Materials Used in the Examples

A list of the materials used in the examples and their suppliers are reported in Table 1 and the properties of the nano-silicate particle suspension (MT-ST) is listed in Table 2 below.

TABLE 1

Materials used in examples and their supplier.

| Material | Supplier |
| --- | --- |
| Mono methyl ether polyethylene glycol (Mw 1100 g mol$^{-1}$) | Fluka |
| Mono methyl ether polyethylene glycol (Mw 2000 g mol$^{-1}$) | Fluka |
| Toluene | Merck |
| Triethoxy(3-isocyantopropyl)silane | Sigma-Aldrich |
| Dibutyltin dilaurate | Aldrich |
| Silicon oxide nano particles in methanol (MT-ST) | Nissan Chemical American Corporation |
| Acrylpropyltrimethoxysilane (Acr-Pr-TMS) | ABCR Chemicals |
| Hydroquinone monoethyl ether | Sigma-Aldrich |
| Trimethyl orthoformate | Sigma-Aldrich |
| Methanol | Merck |
| Polyethylene glycol diacrylate (Mw 248 g mol$^{-1}$) | Sigma-Aldrich |
| Irgacure 184 | Ciba Chemicals |

TABLE 2

Properties of dispersed silicon oxide nano particles.

| Particle suspension | Particle shape | Particle size/nm | SiO$_2$/wt % | H$_2$O/% | Viscosity/mPa·s | Specific gravity | pH | Solvent |
| --- | --- | --- | --- | --- | --- | --- | --- | --- |
| MT-ST | Spherical | 10-15 | 30.6 | 1.7 | 1.5 | 0.998 | 2-4 | Methanol |

Preparation of mPEG Trimethoxysilane Polymer Chains.

Mono methyl ether polyethylene glycol (mPEG) (Mw=1100 and 2000 g mol$^{-1}$) was dissolved in toluene and the mixture was dried.

At room temperature and under nitrogen, a molar equivalent with respect to mPEG of triethoxy(3-isocyantopropyl) silane, was added drop wise to the reaction mixture. As a catalyst a few drops of dibutyltin dilaurate were added, whereafter the reaction mixture was stirred continuously for 24 hours at 50° C. The reaction was followed by infrared spectroscopy; the isocyanate signal occurs at ca. 2271 cm$^{-1}$. Upon completion, approximately two thirds of the toluene was removed by rotary evaporation and the mPEG trimethoxysilane was precipitated into hexane and washed several times. The resulting solid was dried and characterized by $^1$H NMR. Reaction yields of >90% were obtained.

Preparation of the Particles Grafted with a Hydrophilic Polymer Chains and Reactive Groups Silicon oxide nano particles suspended in methanol (MT-ST) were grafted with acrylpropyltrimethoxysilane (Acr-Pr-TMS) and one of the mPEG trimethoxysilane polymers obtained as above, together with hydroquinone monoethyl ether to inhibit the polymerization of the acrylate groups.

For preparing the silicon oxide nano particles, the above mentioned silane compounds hydroquinone monoethyl ether were stirred together in an excess of water (with respect to the Acr-Pr-TMS concentration) and heated under reflux for two hours. Table 3 shows the exact amounts of each chemical used.

TABLE 3

Compounds in weight percentages used for the preparation of hydrophilic reactive particles.

| Material | Modified Silicon oxide nano particle A | Modified Silicon oxide nano particle B | Modified Silicon oxide nano particle C | Modified Silicon oxide nano particle D |
| --- | --- | --- | --- | --- |
| MT-ST Silicon oxide nano particles | 27.0 wt % | 25.65 wt % | 26.14 wt % | 26.4 wt % |
| Acr-Pr-TMS | 3.75 wt % | 3.56 wt % | 3.16 wt % | 3.91 wt % |
| mPEG trimethoxysilane (Mw 1100 g mol$^{-1}$) | 3.81 wt % | 7.29 wt % | 7.32 wt % | — |
| mPEG trimethoxysilane (Mw 2000 g mol$^{-1}$) | — | — | — | 4.09 wt % |
| Hydroquinone monoethyl ether (inhibit polymerisation) | 0.05 wt % | 0.05 wt % | 0.05 wt % | 0.05 wt % |
| Trimethyl orthoformate (dehydrating agent) | 3.07 wt % | 4.77 wt % | 3.74 wt % | 3.79 wt % |
| Methanol (solvent) | 61.67 wt % | 58.18 wt % | 59.0 wt % | 61.0 wt % |
| Water | 0.65 wt % | 0.50 wt % | 0.59 wt % | 0.55 wt % |
| Total | 100 wt % | 100 wt % | 100 wt % | 100 wt % |

Examples 1-9

Preparation of Coated Substrates

Various formulations were prepared by mixing the modified silicon oxide nano particles A-D, according to Table 3 above, with a reactive diluent, polyethylene glycol diacrylate (Mw=248 g mol$^{-1}$), an adhesion promoter comprising Acr-Pr-TMS, and a photo initiator, Irgacure 184. The exact weights used for the formulations are shown in Tables 4 and 5.

Thin films of various formulations were prepared on glass microscope slides (for measurements of wetting properties, nanoindentation) and on silicon wafers with a 2.5 nm silica oxide layer (for measurements of durability, thickness determination and protein adsorption experiments).

A drop of the formulation (see Tables 4 and 5) was applied to the cleaned substrate and allowed to spin at a rate of 2000 r.p.m. for 20 seconds. The resultant wet spin-coated samples were cross-linked with UV radiation using a D-bulb in an inert environment at a dose of ~2.0 J/cm². The coated substrates were then post baked (i.e. heated) by exposure to an IR lamp up to the temperature 120° C. and then placed in an oven at 70° C. for 12 hours.

Measurement of Static Water Contact Angle

Static contact angle measurements were measured of coatings according to examples 1-6 using an apparatus comprising a syringe, sample stage and video camera. Images were analysed using Vision Gauge Software (standard edition, version 6.39).

Prior to the measurements, calibration of the camera and the surface tension of the water in the syringe were measured. The latter was carried out by dispensing a droplet of water from the syringe, and then recording the image whilst the droplet was still attached to the syringe. The software measured the dimensions of the droplet and used them to calculate the surface tension.

The static contact angle of the samples was measured by dispensing a 50 μl droplet of distilled water onto the surface of the coated substrate. Ten images of the droplet were taken over a 135 second period. From the images, the software determined the baseline (the surface) and the edges of the droplet; the contact angle was calculated where these lines intercept. After that the average value of the 10 images was calculated. The contact angles were determined for at least two droplets deposited different areas of the surface.

Results of the static water contact angle for the coatings formulations on glass substrates according to Examples formulations 1-6 are reported in Table 4.

TABLE 4

Example formulations for coatings prepared on glass substrates and their static water contact angle.

| Material | Example 1 g | Example 2 g | Example 3 g | Example 4 g | Example 5 g | Example 6 g |
|---|---|---|---|---|---|---|
| Modified Silicon oxide nano particle A | 3.0 | 3.0 | 3.0 | — | — | — |
| Modified Silicon oxide nano particle D | — | — | — | 3.0 | 3.0 | 3.0 |
| Polyethylene glycol diacrylate Mw 248 g mol⁻¹ | — | 0.05 | 0.1 | — | 0.1 | 0.1 |
| Acr-Pr-TMS | 0.05 | 0.05 | 0.1 | 0.1 | — | 0.1 |
| Photo initiator irgacure 184 (trademark by Ciba) | 0.002 | 0.002 | 0.002 | 0.002 | 0.002 | 0.002 |
| Water contact angle after 135 s/° | 18 | 12 | 31 | 32 | 27 | 26 |

TABLE 5

Example formulations for coatings prepared on silicon wafer substrates with a 2.5 nm silica oxide layer.

| Material | Example 7 g | Example 8 g | Example 9 g |
|---|---|---|---|
| Modified Silicon oxide nano particle A | 0.61 | — | — |
| Modified Silicon oxide nano particle B | — | 0.57 | — |
| Modified Silicon oxide nano particle C | — | — | 0.52 |
| Acr-Pr-TMS | 0.01 | 0.01 | 0.01 |
| Methanol | 2.79 | 2.79 | 2.82 |
| Water | 6.50 | 6.53 | 6.58 |
| Photo initiator Irgacure 184 100 wt % solution in methanol (trademark by Ciba) | 0.02 | 0.02 | 0.02 |

Durability Measurements

Coating formulations prepared on the Silicon wafers were deposited in water at room temperature and visually inspected over time. The ranking was performed after 14 days and their appearance is shown in Table 6. It can be seen that coatings retained their integrity after prolonged immersion in water.

TABLE 6

Appearance of coatings after immersion for 14 days in water.

| Example | Appearance |
|---|---|
| 7 | Intact |
| 8 | Intact |
| 9 | Intact |

Nanoindentation Measurements

In order to measure the hardness of the coatings, nanoindentation was performed on several samples in the dry state. The reference materials for such indentations were polycarbonate and a typical UV-curable hard-coat comprising reactive nanoparticles.

The indentations were performed with a Micromaterials 600 using a typical SiN Berkovitch indenter. Indentation were made at 500 nm and 10 measurements were made, which are averaged. The hardness and reduced modulus of the coating are determined via the standard Oliver & Pharr method. In Table 7 these values are given.

It can be seen that the reduced modulus and hardness of the coatings comprising hydrophilic reactive particles are in the same regime as typical values for UV-curable hard-coats and surpass those of thermoplastic polymers.

TABLE 7

Hardness and Reduced modulus from nanoindentation results on dry coatings at 500 nm depth for Example formulations 3 and 6, reference hard-coat and reference polycarbonate.

| Coating | Hardness (GPa) | Reduced modulus (GPa) |
|---|---|---|
| Example formulation 3 | 0.72 +/− 0.02 | 13.0 +/− 0.5 |
| Example formulation 6 | 0.49 +/− 0.02 | 8.0 +/− 0.3 |
| Reference hard-coat | 0.60 +/− 0.02 | 7.0 +/− 0.13 |
| Reference polycarbonate | 0.17 +/− 0.02 | 2.1 +/− 0.42 |

Protein Adsorption Measurements

Protein adsorption measurements on the coatings prepared on the silicon wafer were carried out by stagnation point flow reflectometry. The instrument set-up, described by Dijt et al. J. Colloids Surf. 51, 141 (1990), consists of a polarized light from a He—Ne laser that is reflected by the coating at the Brewster angle in a hydrodynamically well-defined position (stagnation point) of the incoming fluid. The detector splits the reflected beam into its parallel (p) and perpendicular (⊥) components and the ratio $S=I_p/I_\perp$ of the respective intensities is measured continuously. Adsorption of material onto the coating interface results in a change, $\Delta S$, and under appropriate conditions (e.g. coating thickness, adsorbed mass) the adsorbed amount, $\Gamma$, exhibits a good linear relationship according to:

$$\Gamma = \frac{\Delta S}{S_0} \cdot Q_f \quad [1]$$

where $S_o$ is the initial ratio prior to adsorption. The constant $Q_r$ is referred to as the quality factor, has units mg m$^{-2}$, and is dependent on the optical system. This was evaluated using a computer programme where an optical model consisting of a layered matrix is used to describe the system. The programme requires values of the coating refractive index, n, and thickness. These were determined by computer null ellipsometery (Sentech Instruments GmbH) at $\lambda$=632.8 nm and angle=70° and the values are reported in Table 8.

A protein solution of lysozyme (Aldrich, Lot 51K7028) (0.156 mg ml$^{-1}$) in 10 mM sodium nitrate buffer (pH 6.2, 250 ml) was prepared. Lysozyme is a small protein (Mw=15 kDa, pI=10.9) that is often used as a model in studies of electrostatic adsorption. Coatings were immersed in the buffer solution prior to the protein adsorption measurements for at least two minutes allowing the coating to equilibrate. All the measurements were carried out using a flow rate of 1.0 ml min$^{-1}$ and the protein sample was allowed to flow following approximately two minutes in the buffer solution flowing in the chamber. Once a plateau had been reached following the introduction of the protein sample, the buffer solution was then allowed to flow. This allows any non-adsorbed proteins to be washed from the coating. The average plateau values of the adsorbed amount of lysozyme protein following the flow of buffer solution, $\Gamma^{pla}$, calculated from three separate samples are reported in Table 8 for Examples 7-9. For comparison, a silicon wafer not comprising a coating was tested too.

TABLE 8

Coating thickness, refractive index (determined by ellipsometry), average $\Gamma^{pla}$ values for films exposed to lysozyme protein solution and then buffer solution for example formulations and a reference silicon wafer with a 75 nm silica oxide layer values.

| | Coating thickness/nm | Refractive index, n | Average $\Gamma^{pla}$ lysozyme protein/mg m$^{-2}$ | Average $\Gamma^{pla}$ lysozyme protein with flow of buffer solution/mg m$^{-2}$ |
|---|---|---|---|---|
| Example 7 | 55.8 | 1.41 | 0.90 | 0.65 |
| Example 8 | 64.4 | 1.47 | 0.44 | 0.28 |
| Example 9 | 47.1 | 1.47 | 0.10 | 0 |
| Silicon wafer with a 75 nm silica oxide layer | 75 | 1.47 | 2.07 | 1.69 |

It can be seen that the coatings according to Examples 7-9 result in a reduction in the amount of adsorbed lysozyme protein when compared with the silicon wafer with a 75 nm oxide layer. It is also interesting to note that a significant amount of protein is desorbed when the buffer solution is allowed to flow into the cell following the protein solution. Moreover, and in agreement with theoretical predications and experimental observations, a decrease in the adsorbed amount of protein is found with increasing the grafting density of mPEG silane on the silicon oxide nano particles.

The invention claimed is:

1. A process for producing a coating composition comprising the steps of:
   (a) providing particles, compounds comprising reactive groups, and compounds comprising hydrophilic polymer chains, and
   (b) separately chemically grafting (i) the compounds comprising the reactive groups, and (ii) the compounds comprising the hydrophilic polymer chains to the particles, wherein
   the hydrophilic polymer chains comprise at least an average of 5 monomer units of ethylene oxide or vinylpyrrolidone.

2. The process of claim 1, wherein the compounds comprising reactive groups are capable of reaction with a substrate on which the coating composition is coated and/or with one another to form a cross-linked phase.

3. The process of claim 1, wherein the particles are inorganic.

4. The process of claim 1, wherein the average smallest diameter of the particles is below 10 micron.

5. The process of claim 1, wherein the particles comprise $SiO_2$, $TiO_2$, $ZnO_2$, $TiO_2$, $SnO_2$, Am—$SnO_2$, $ZrO_2$, Sb—$SnO_2$, $Al_2O_3$, Au or Ag.

6. The process of claim 1, wherein the hydrophilic polymer chains comprise monomer units of ethylene oxide.

7. The process of claim 1, further comprising adding to the coating composition a compound that increases adhesion of the coating to the substrate.

8. The process of claim 1, further comprising adding to the coating composition one or more species that diffuse out of a coating comprising the composition during usage.

9. The process of claim 1, further comprising the step of adding to a coating composition one or more species to impart anti-biofouling or anti-thrombogenic properties to the coating composition during usage.

10. A process for coating a substrate which comprises coating onto a surface of a substrate a coating composition as in claim 1.

11. The process of claim 1, wherein at least 20% of the hydrophilic polymer chains do not comprise a reactive group.

12. The process of claim 1, wherein at least 80% of the hydrophilic polymer chains do not comprise a reactive group.

13. A coating composition produced by the process of claim 1.

14. The coating composition of claim 13 wherein the coating composition is bioreactive.

15. An article coated by the coating composition of claim 13.

16. A process for coating an article comprising:
   (a) coating an article with the coating composition of claim 13, and
   (b) cross-linking the coating composition applied to the article.

17. An article coated by the process of claim 16.

* * * * *